United States Patent
Ko (10) Patent No.: US 9,144,362 B2
(45) Date of Patent: Sep. 29, 2015

(54) MOVEMENT OPERATION SYSTEM FOR AUTONOMOUS MOVING CLEANING APPARATUS

(71) Applicant: Joseph Y. Ko, Laguna Niguel, CA (US)

(72) Inventor: Joseph Y. Ko, Laguna Niguel, CA (US)

(*) Notice: Subject to any disclaimer, the term of this patent is extended or adjusted under 35 U.S.C. 154(b) by 155 days.

(21) Appl. No.: 14/140,318

(22) Filed: Dec. 24, 2013

(65) Prior Publication Data

US 2014/0101885 A1 Apr. 17, 2014

Related U.S. Application Data

(63) Continuation-in-part of application No. 13/465,313, filed on May 7, 2012, now Pat. No. 8,744,662.

(51) Int. Cl.
| | |
|---|---|
| *G01C 22/00* | (2006.01) |
| *G05D 1/00* | (2006.01) |
| *A47L 11/40* | (2006.01) |
| *A47L 9/28* | (2006.01) |
| *G05D 1/02* | (2006.01) |

(52) U.S. Cl.
CPC ........... *A47L 11/4066* (2013.01); *A47L 9/2831* (2013.01); *A47L 9/2873* (2013.01); *A47L 9/2894* (2013.01); *A47L 11/4011* (2013.01); *G05D 1/0225* (2013.01); *G05D 1/0234* (2013.01); *G05D 1/0242* (2013.01); *A47L 2201/022* (2013.01); *G05D 2201/0203* (2013.01); *G05D 2201/0215* (2013.01)

(58) Field of Classification Search
CPC ... A47L 9/2873; A47L 9/2831; A47L 9/2894; A47L 11/4011; A47L 11/4066; A47L 2201/022; G05D 1/0234; G05D 1/0242; G05D 1/0225; G05D 2201/0215; G05D 2201/0203
USPC .......................................................... 701/23
See application file for complete search history.

(56) References Cited

U.S. PATENT DOCUMENTS

| | | | |
|---|---|---|---|
| 6,594,844 B2 | 7/2003 | Jones | |
| 6,883,201 B2 | 4/2005 | Jones et al. | |
| 2003/0137268 A1* | 7/2003 | Papanikolopoulos et al. | 318/568.11 |
| 2007/0244610 A1* | 10/2007 | Ozick et al. | 701/23 |
| 2013/0138247 A1* | 5/2013 | Gutmann et al. | 700/253 |

* cited by examiner

*Primary Examiner* — Calvin Cheung
*Assistant Examiner* — Paula L Schneider
(74) *Attorney, Agent, or Firm* — Muncy, Geissler, Olds & Lowe, P.C.

(57) ABSTRACT

A movement operation system for autonomous moving cleaning apparatus comprises a charging dock and an autonomous moving cleaning apparatus. The charging dock includes a charging module and an infrared ray emitter. The autonomous moving cleaning apparatus includes a battery, at least one servomotor, an infrared ray receiver and a microcontroller unit. The infrared ray receiver receives an encrypted infrared signal emitted by the infrared ray emitter and sends the encrypted infrared signal to the microcontroller unit for decoding. The microcontroller unit detects whether the present voltage of the battery is higher than a charge voltage of the charging module, and generates a control signal to control the servomotor to move the autonomous moving cleaning apparatus away from the charging dock or to the charging dock for charging the battery.

18 Claims, 6 Drawing Sheets

MOVEMENT OPERATION SYSTEM FOR AUTONOMOUS MOVING CLEANING APPARATUS

This application is a continuation-in-part, and claims priority, of from U.S. patent application Ser. No. 13/465,313 filed on May 7, 2012, entitled "METHOD FOR OPERATING AUTONOMOUS MOVING CLEANING APPARATUS", the entire contents of which are hereby incorporated by reference.

FIELD OF THE INVENTION

The present invention relates to an autonomous moving cleaning apparatus and particularly to a movement operation system for autonomous floor sweeping machines, vacuum cleaners or floor moping machines.

BACKGROUND OF THE INVENTION

U.S. Pat. Nos. 6,883,201 and 6,594,844 disclose autonomous moving cleaning apparatus that can serve as a floor sweeping machine, a vacuum cleaner or a floor moping machine. It has a plurality of sensors located at the lower side, front side or periphery to prevent strong impact when encountering obstacles, or falling to a descending staircase to result in damage of the floor sweeping machine, vacuum cleaner or floor moping machine. To avoid those apparatus from impact or falling down they have to rely on the sensors to provide correct information so that they can move forwards, decelerate, move backwards or stop moving.

However, in the aforesaid conventional techniques, malfunction often occurs to the floor sweeping machine, vacuum cleaner or floor moping machine. This is caused by too many types of lights existing in the external environments during operation. Hence when the sensors receive those lights, they cannot correctly judge or interpret to result in abnormal forward movement, deceleration, backward movement or stop. This also makes their lifespan shorter and becomes the biggest problem of the conventional products yet to be resolved.

SUMMARY OF THE INVENTION

The primary object of the present invention is to overcome the aforesaid disadvantages of the conventional techniques by providing a movement operation system to enable an autonomous moving cleaning apparatus to function steadily without being interfered by external lights or infrared rays.

To achieve the foregoing object, the present invention provides a movement operation system for autonomous moving cleaning apparatus that comprises a charging dock and an autonomous moving cleaning apparatus. The charging dock includes a charging module to output charge electric power and an infrared ray emitter to emit at least one encrypted infrared signal. The autonomous moving cleaning apparatus includes a battery, a driving wheel, a floor sweeping roller, at least one servomotor, an infrared ray receiver, a microcontroller unit (MCU in short hereinafter), a light emitter and a light receiver. The battery has a predetermined charge voltage and provides electric power for the autonomous moving cleaning apparatus to operate. The servomotor drives the driving wheel and floor sweeping roller. The driving wheel drives the autonomous moving cleaning apparatus to move to enable the floor sweeping roller to clean dirt on a floor.

The MCU controls the servomotor to rotate and provides a digital signal which is processed through an encoding technique to form an encrypted code data set for sending out continuously. When the infrared ray receiver receives the encrypted infrared signal, the MCU decodes the encrypted infrared signal and detects the present voltage of the battery. In the event that the present voltage of the battery is higher than the charge voltage, the MCU generates a first control signal to control the servomotor to move the autonomous moving cleaning apparatus away from the charging dock; and in the event that the present voltage of the battery is lower than the charge voltage, the MCU generates a second control signal to control the servomotor to move the autonomous moving cleaning apparatus to the charging dock and couple therewith to receive the charge electric power to charge the battery.

The light emitter is activated by a voltage sent and converted by the MCU. The light receiver receives the light from the light emitter and converts it and sends to the MCU. The function key aims to select preset functions provided by the MCU to control the servomotor. The data values in the encrypted code data set are converted to a low or high voltage to activate the light emitter to generate dim or bright light. The light receiver incessantly receives reflective dim or bright light generated by the light emitter to form a corresponding low or high voltage which is then converted to a corresponding digital signal for providing to the MCU to compare with the encrypted code data set for decoding. The MCU, according to decoding correctness and strong, weak, present or absent condition of the detected digital signal, can control the servomotor to rotate forward, decelerate, rotate backward or stop rotating.

In one embodiment the encrypted code data set is formed via a Manchester encoding technique.

In another embodiment the MCU further includes an encoder to form the encrypted code data set and a decoder to compare the digital signal with the encrypted code data set for decoding.

In yet another embodiment the autonomous moving cleaning apparatus further includes an electronic switch controlled by the data values of the encrypted code data set and an analog-to-digital converter (A/D converter in short hereinafter) to convert the low or high voltage formed by the light received by the light receiver to the corresponding digital signal.

In yet another embodiment the autonomous moving cleaning apparatus is a floor sweeping machine.

In yet another embodiment the encrypted infrared signal includes a first encrypted infrared signal with a first operating frequency and a second encrypted infrared signal with a second operating frequency.

To achieve the foregoing object, the present invention provides another movement operation system for autonomous moving cleaning apparatus that comprises a charging dock and an autonomous moving cleaning apparatus. The charging dock includes a charging module to output charge electric power and an infrared ray emitter to emit at least one encrypted infrared signal. The autonomous moving cleaning apparatus includes a battery, a driving wheel, a dust suction fan motor, at least one servomotor, an infrared ray receiver, an MCU, a light emitter and a light receiver. The battery has a predetermined charge voltage and provides electric power for the autonomous moving cleaning apparatus to operate. The servomotor drives the driving wheel and dust suction fan motor. The driving wheel drives the autonomous moving cleaning apparatus to move to enable the dust suction fan motor to clean dirt on a floor.

The MCU provides a digital signal which is processed through an encoding technique to form an encrypted code data set for sending out continuously and controls the servomotor to rotate. When the infrared ray receiver receives the encrypted infrared signal, the MCU decodes the encrypted infrared signal and detects the present voltage of the battery. In the event that the present voltage of the battery is higher than the charge voltage, the MCU generates a first control signal to control the servomotor to move the autonomous moving cleaning apparatus away from the charging dock; and in the event that the present voltage of the battery is lower than the charge voltage, the MCU generates a second control signal to control the servomotor to move the autonomous moving cleaning apparatus to the charging dock and couple therewith to receive the charge electric power to charge the battery.

The light emitter is activated by a voltage sent and converted by the MCU. The light receiver receives the light from the light emitter and converts it and sends to the MCU. The function key aims to select preset functions provided by the MCU to control the dust suction fan motor and servomotor. The data values in the encrypted code data set are converted to a low or high voltage to activate the light emitter to generate dim or bright light. The light receiver incessantly receives the reflective dim or bright light generated by the light emitter to form a corresponding low or high voltage which is then converted to a corresponding digital signal for providing to the MCU to compare with the encrypted code data set for decoding. The MCU, according to decoding correctness and strong, weak, present or absent condition of the detected digital signal, can control the servomotor to rotate forward, decelerate, rotate backward or stop rotating.

In one embodiment the encrypted code data set is formed via a Manchester encoding technique.

In another embodiment the MCU further includes an encoder to form the encrypted code data set and a decoder to compare the digital signal with the encrypted code data set for decoding.

In yet another embodiment the autonomous moving cleaning apparatus further includes an electronic switch controlled by the data values of the encrypted code data set and an A/D converter to convert the low or high voltage formed by the light received by the light receiver to the corresponding digital signal.

In yet another embodiment the autonomous moving cleaning apparatus is a vacuum cleaner with a dust suction port at a lower side thereof connecting with the dust suction fan motor.

In yet another embodiment the encrypted infrared signal includes a first encrypted infrared signal with a first operating frequency and a second encrypted infrared signal with a second operating frequency.

To achieve the foregoing object, the present invention provides another movement operation system for autonomous moving cleaning apparatus that comprises a charging dock and an autonomous moving cleaning apparatus. The charging dock includes a charging module to output charge electric power and an infrared ray emitter to emit at least one encrypted infrared signal. The autonomous moving cleaning apparatus includes a battery, a driving wheel, at least one servomotor, an infrared ray receiver, an MCU, a light emitter and a light receiver. The battery has a predetermined charge voltage and provides electric power for the autonomous moving cleaning apparatus to operate. The servomotor drives the driving wheel. The driving wheel drives the autonomous moving cleaning apparatus to move.

The MCU provides a digital signal which is processed through an encoding technique to form an encrypted code data set for sending out continuously and controls the servomotor to rotate. When the infrared ray receiver receives the encrypted infrared signal, the MCU decodes the encrypted infrared signal and detects the present voltage of the battery. In the event that the present voltage of the battery is higher than the charge voltage, the MCU generates a first control signal to control the servomotor to move the autonomous moving cleaning apparatus away from the charging dock; and in the event that the present voltage of the battery is lower than the charge voltage, the MCU generates a second control signal to control the servomotor to move the autonomous moving cleaning apparatus to the charging dock and couple therewith to receive the charge electric power to charge the battery.

The light emitter is activated by a voltage sent and converted by the MCU. The light receiver receives the light from the light emitter and converts it and sends to the MCU. The function key aims to select preset functions provided by the MCU to control the servomotor. The data values in the encrypted code data set are converted to a low or high voltage to activate the light emitter to generate dim or bright light. The light receiver incessantly receives the reflective dim or bright light generated by the light emitter to form a corresponding low or high voltage which is then converted to a corresponding digital signal for providing to the MCU to compare with the encrypted code data set for decoding. The MCU, according to decoding correctness and strong, weak, present or absent condition of the detected digital signal, can control the servomotor to rotate forward, decelerate, rotate backward or stop rotating.

In one embodiment the encrypted code data set is formed via a Manchester encoding technique.

In another embodiment the microcontroller unit further includes an encoder to form the encrypted code data set and a decoder to compare the digital signal with the encrypted code data set for decoding.

In yet another embodiment the autonomous moving cleaning apparatus further includes an electronic switch controlled by the data values of the encrypted code data set and an A/D converter to convert the low or high voltage formed by the light received by the light receiver to the corresponding digital signal.

In yet another embodiment the autonomous moving cleaning apparatus is a floor moping machine with a floor moping element attached to a lower side thereof to clean dirt of a floor.

In yet another embodiment the encrypted infrared signal includes a first encrypted infrared signal with a first operating frequency and a second encrypted infrared signal with a second operating frequency.

The movement operation system for autonomous moving cleaning apparatus according to the invention functions mainly by emitting an encrypted infrared signal which is decoded by the MCU, and detecting the present voltage of the battery by the MCU. When the present voltage of the battery is higher than the charge voltage, the MCU generates a first control signal to move the autonomous moving cleaning apparatus away from the charging dock without hitting thereof during normal operation. When the present voltage of the battery is lower than the charge voltage, the MCU generates a second control signal to move the autonomous moving cleaning apparatus to the charging dock for coupling and charging since the battery is deficient in voltage and requires charging. The encrypted infrared signal can be encrypted in different codes or operating frequencies for the autonomous moving cleaning apparatus to identify whether the infrared ray is valid or belongs to other infrared ray sources so that the autonomous moving cleaning apparatus can steadily and smoothly perform operation without being interfered by external lights or other infrared rays.

The foregoing, as well as additional objects, features and advantages of the invention will be more readily apparent

DETAILED DESCRIPTION OF THE PREFERRED EMBODIMENTS

Figure 1:
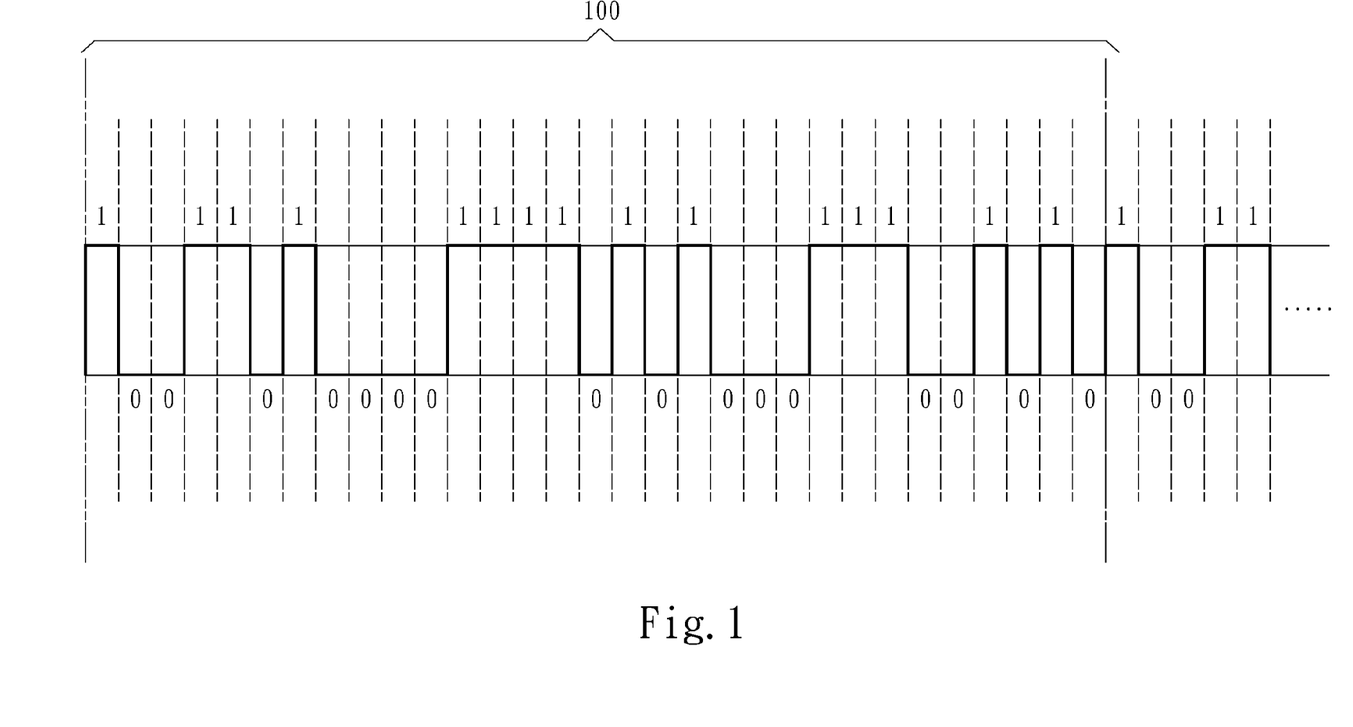
FIG. 1 is a schematic graph showing consecutive digital signals of an encrypted code data set according to the invention.
Figure 2:
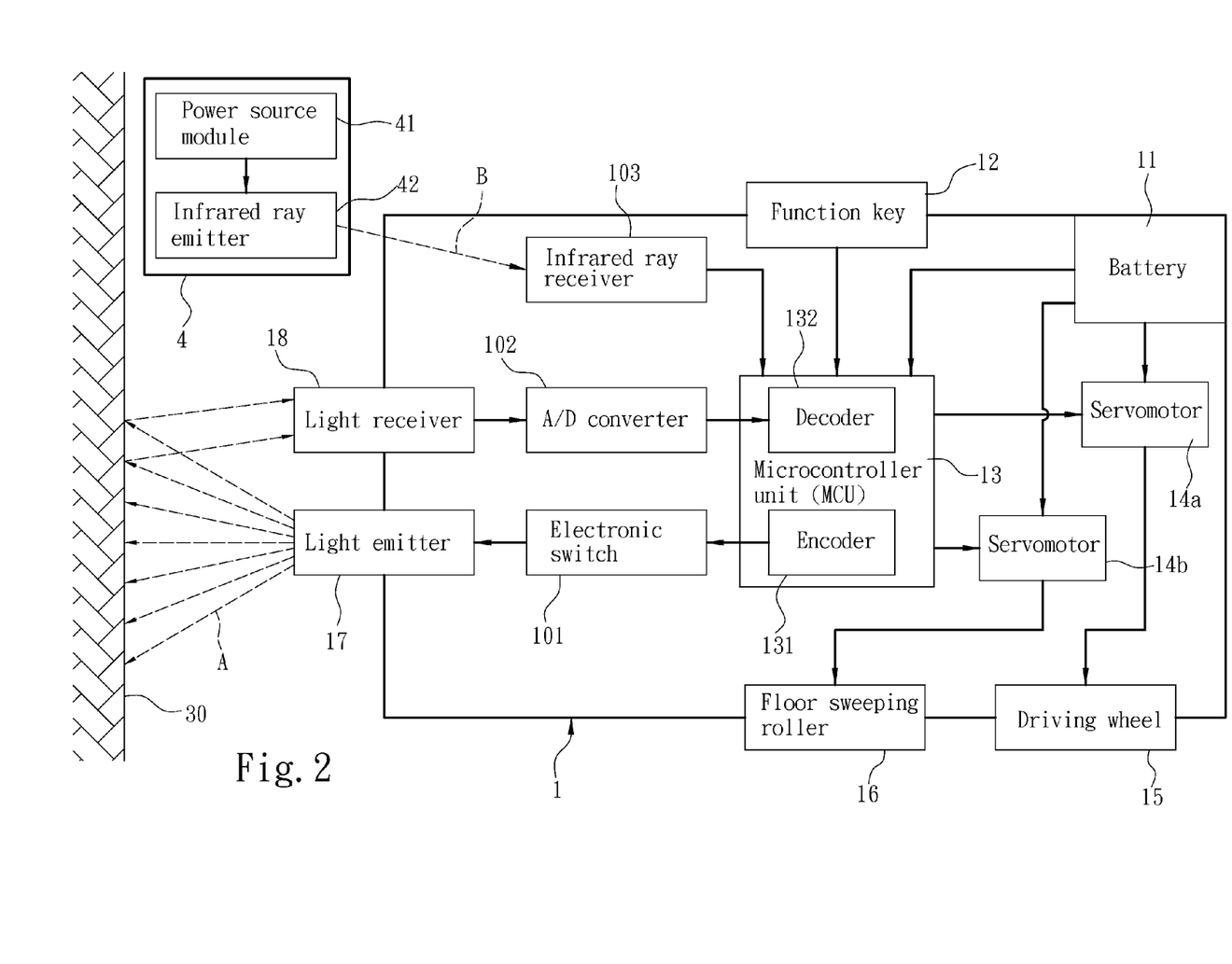
FIG. 2 is a schematic block diagram of a first embodiment of the movement operation system of the invention.

Please refer to FIGS. 1 and 2, the present invention aims to provide a movement operation system for autonomous moving cleaning apparatus that comprises an autonomous moving cleaning apparatus 1 and a charging dock 4. The charging dock 4 includes a charging module 41 to output charge electric power and an infrared ray emitter 42 to emit at least one infrared ray B. The infrared ray B includes at least one encrypted infrared signal. The autonomous moving cleaning apparatus 1 includes a battery 11 which has a predetermined charge voltage and provides electric power for the autonomous moving cleaning apparatus 1 to operate, a driving wheel 15 to drive the autonomous moving cleaning apparatus 1 to move, a floor sweeping roller 16 to clean dirt on a floor, at least one servomotor 14a and 14b to drive the driving wheel 15 and floor sweeping roller 16, an infrared ray receiver 103 to receive the encrypted infrared signal, and a microcontroller unit (MCU) 13 to control the servomotors 14a and 14b to rotate. The MCU 13 provides a digital signal which is processed through an encoding technique, such as a Manchester encoding technique, to form an encrypted code data set 100 (referring to FIG. 1) like "1001101000111101010001111001010" for sending out continuously. The MCU 13 also decodes the encrypted infrared signal and detects the present voltage of the battery 11. In the event that the present voltage of the battery 11 is higher than the charge voltage, the MCU 13 generates a first control signal to control the servomotors 14a and 14b to move the autonomous moving cleaning apparatus 1 away from the charging dock 4. In the event that the present voltage of the battery 11 is lower than the charge voltage, the MCU 13 generates a second control signal to control the servomotors 14a and 14b to move the autonomous moving cleaning apparatus 1 to the charging dock 4 and couple therewith to receive the charge electric power to charge the battery 11.

The autonomous moving cleaning apparatus 1 also includes a light emitter 17 (such as an LED tube) activated by a voltage transmitted and converted by the MCU 13, a light receiver 18 to receive light A from the light emitter 17 and convert the light and transmit to the MCU 13, and a function key 12 to select preset functions provided by the MCU 13 to control the servomotors 14a and 14b. The MCU 13 further can include an encoder 131 to form the encrypted code data set 100 and a decoder 132 to compare the digital signal with the encrypted code data set 100 for decoding. The autonomous moving cleaning apparatus 1 also can include an electronic switch 101 (such as a triode or MOS tube) controlled by data values of the encrypted code data set 100 and an A/D converter 102 to convert the low or high voltage formed by the light A received by the light receiver 18 to the corresponding digital signal. Thus, the MCU 13 can continuously send the encrypted code data sets 100 with their data values converted to the low or high voltage through the electronic switch 101 to activate the light emitter 17 to generate dim or bright light A. The light receiver 18 incessantly receives the light reflected by an obstacle 30 from the dim or bright light A to form a corresponding low or high voltage which is then converted by the A/D converter 102 to become a corresponding digital signal for providing to the MCU 13 to compare with the encrypted code data set 100 for decoding so that the MCU 13 can control the servomotors 14a and 14b to rotate forward, decelerate, rotate backward or stop rotating according to decoding correctness and strong, weak, present or absent condition of the detected digital signal. The autonomous moving cleaning apparatus 1 is a floor sweeping machine.

Figure 5:
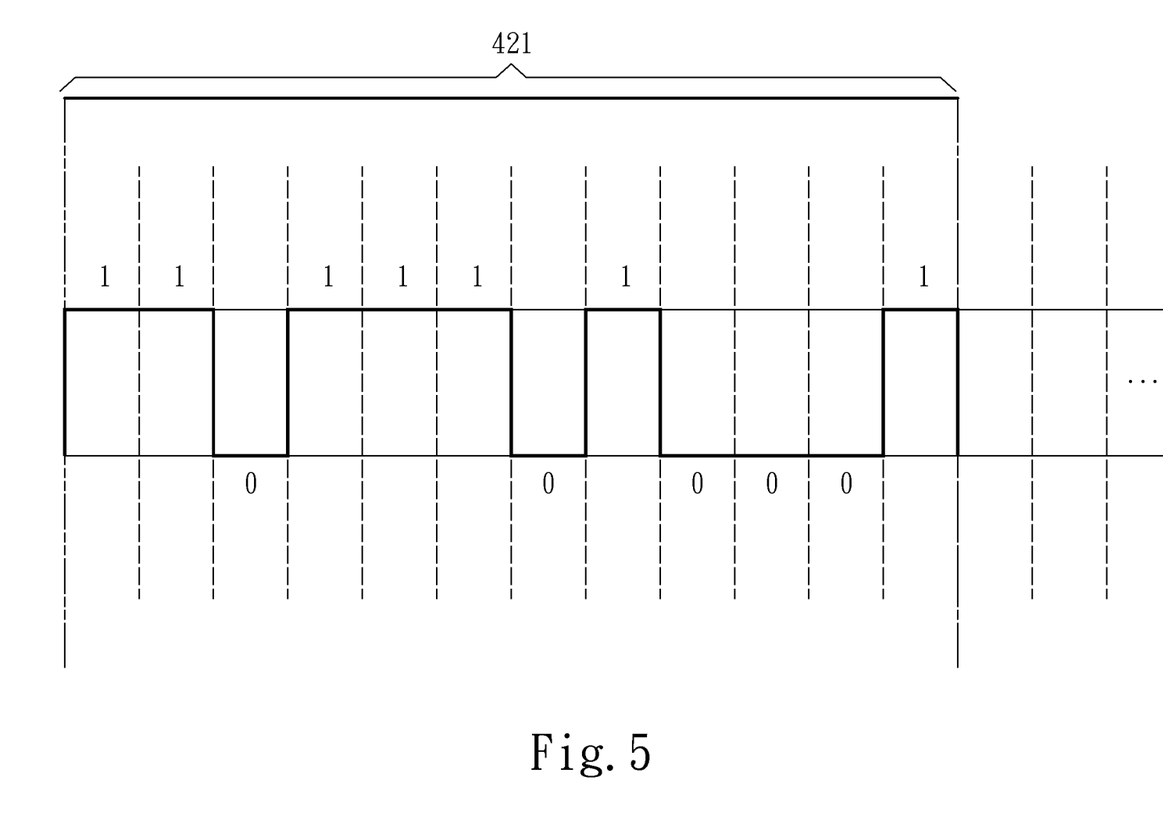
FIG. 5 is a schematic graph showing consecutive digital signals of a first encrypted infrared signal.
Figure 6:
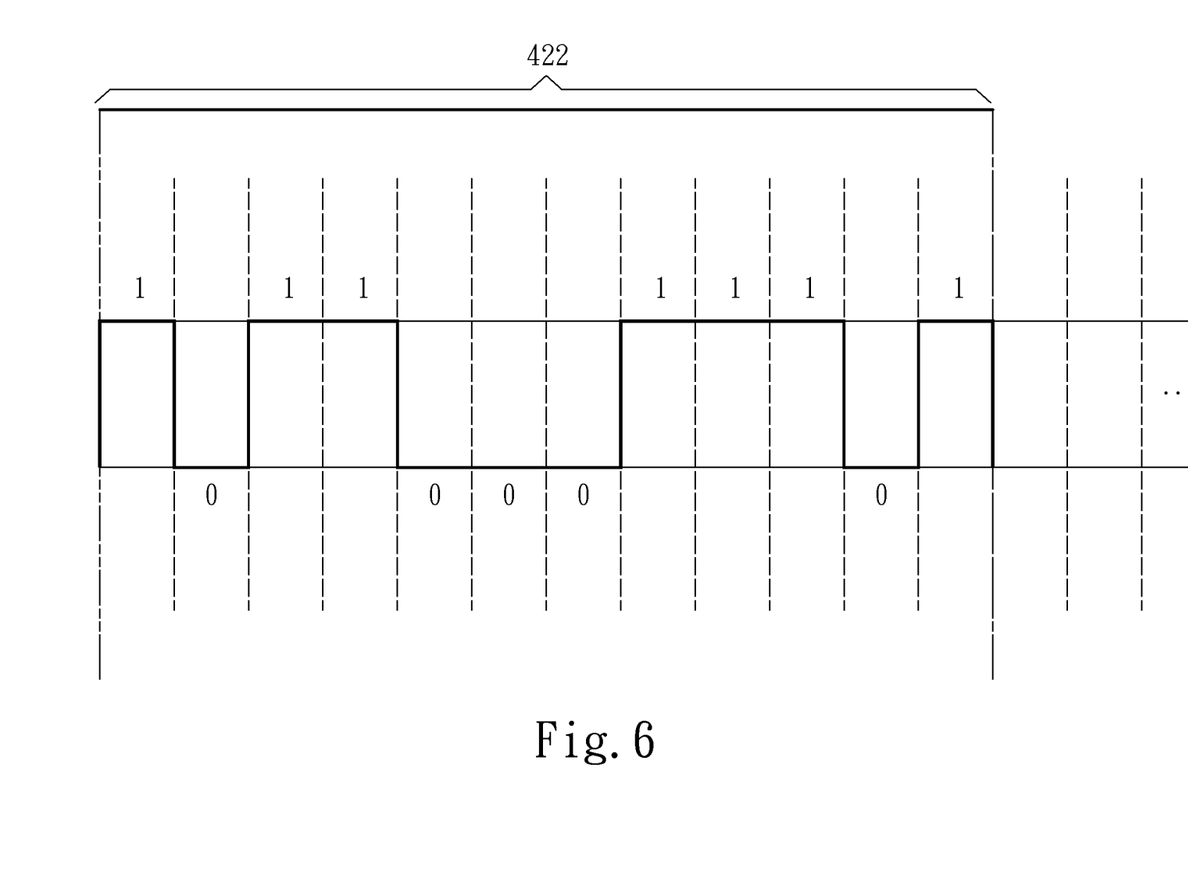
FIG. 6 is a schematic graph showing consecutive digital signals of a second encrypted infrared signal.

Please refer to FIGS. 5 and 6 for the continuous digital signals of the first and second encrypted infrared signals. The encrypted infrared signal further includes a first encrypted infrared signal 421 with a first encrypted code and a first operating frequency, and a second encrypted infrared signal 422 with a second encrypted code and a second operating frequency. That means the infrared ray emitter 42 can emit the first encrypted infrared signal 421 and second encrypted infrared signal 422 in different encrypted codes, such as the encrypted code of the first encrypted infrared signal 421 being 110111010001, while the encrypted code of the second encrypted infrared signal 422 being 101100011101; or the infrared ray emitter 42 can emit the first encrypted infrared signal 421 and second encrypted infrared signal 422 in a same encrypted code but different operating frequencies, such as 38 KHZ for the first encrypted infrared signal 421 and 50 KHZ for the second encrypted infrared signal 422, thereby the autonomous moving cleaning apparatus 1 can identify the received infrared signal against other infrared ray sources (such as infrared rays emitted from other machinery, sunlight or other lamp lights).

Figure 3:
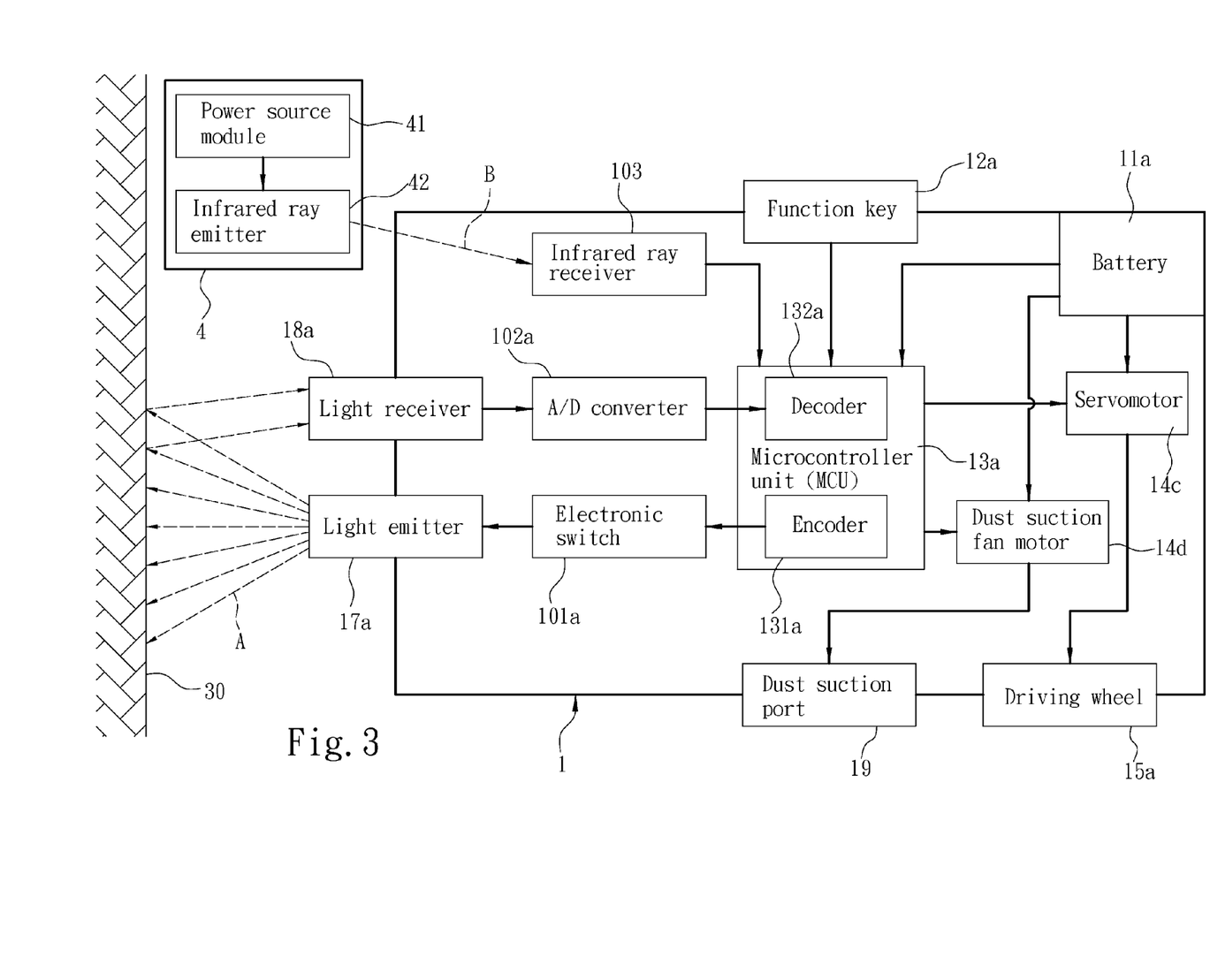
FIG. 3 is a schematic block diagram of a second embodiment of the movement operation system of the invention.

Please refer to FIG. 3 for a second embodiment of the movement operation system for autonomous moving cleaning apparatus according to the invention. It comprises an autonomous moving cleaning apparatus 1 and a charging dock 4. The charging dock 4 includes a charging module 41 to output charge electric power and an infrared ray emitter 42 to emit at least one infrared ray B. The infrared ray B includes at least one encrypted infrared signal. The autonomous moving cleaning apparatus 1 includes at least a battery 11a which has a predetermined charge voltage and provides electric power for the autonomous moving cleaning apparatus 1 to operate, a driving wheel 15a to drive the autonomous moving cleaning apparatus 1 to move, a dust suction fan motor 14d to clean dirt on a floor, at least one servomotor 14c to drive the driving wheel 15a, an infrared ray receiver 103 to receive the encrypted infrared signal, and an MCU 13a to control the servomotor 14c and the dust suction fan motor 14d to rotate. The MCU 13a provides a digital signal which is processed through an encoding technique, such as a Manchester encoding technique, to form an encrypted code data set 100 for sending out continuously. The MCU 13a also decodes the encrypted infrared signal and detects the present voltage of the battery 11a. In the event that the present voltage of the battery 11a is higher than the charge voltage, the MCU 13a generates a first control signal to control the servomotor 14c to move the autonomous moving cleaning apparatus 1 away from the charging dock 4. In the event that the present voltage of the battery 11a is lower than the charge voltage, the MCU 13a generates a second control signal to control the servomotor 14c to move the autonomous moving cleaning apparatus 1 to the charging dock 4 and couple therewith to receive the charge electric power to charge the battery 11a.

The autonomous moving cleaning apparatus 1 also includes a light emitter 17a (such as an LED tube) activated by a voltage transmitted and converted by the MCU 13a, a light receiver 18a to receive light A from the light emitter 17a and convert the light and transmit to the MCU 13a, and a function key 12a to select preset functions provided by the MCU 13a to control the dust suction fan motor 14d and servomotor 14c. The MCU 13a further can include an encoder 131a to form the encrypted code data set 100 (as shown in FIG. 1) and a decoder 132a to compare the digital signal with the encrypted code data set 100 for decoding. The autonomous moving cleaning apparatus 1 also can include an electronic switch 101a (such as a triode or MOS tube) controlled by data values of the encrypted code data set 100 and an A/D converter 102a to convert the low or high voltage formed by the light A received by the light receiver 18a to the corresponding digital signal. Thus, the MCU 13a can continuously send the encrypted code data sets 100 with their data values converted to the low or high voltage through the electronic switch 101a to activate the light emitter 17a to generate dim or bright light A. The light receiver 18a incessantly receives the light reflected by an obstacle 30 from the dim or bright light A to form a corresponding low or high voltage which is then converted by the A/D converter 102a to become a corresponding digital signal for providing to the MCU 13a to compare with the encrypted code data set 100 for decoding so that the MCU 13a can control the servomotors 14c to rotate forward, decelerate, rotate backward or stop rotating according to decoding correctness and strong, weak, present or absent condition of the detected digital signal. The autonomous moving cleaning apparatus 1 is a vacuum cleaner with a dust suction port 19 at a lower side connecting with the dust suction fan motor 14d.

Please refer to FIGS. 5 and 6 for the continuous digital signals of the first and second encrypted infrared signals. The encrypted infrared signal further includes a first encrypted infrared signal 421 with a first encrypted code and a first operating frequency and a second encrypted infrared signal 422 with a second encrypted code and a second operating frequency. That means the infrared ray emitter 42 can emit the first encrypted infrared signal 421 and second encrypted infrared signal 422 in different encrypted codes, such as the encrypted code of the first encrypted infrared signal 421 being 110111010001, while the encrypted code of the second encrypted infrared signal 422 being 101100011101 or the infrared ray emitter 42 can emit the first encrypted infrared signal 421 and second encrypted infrared signal 422 in a same encrypted code but different operating frequencies, such as 38 KHZ for the first encrypted infrared signal 421 and 50 KHZ for, the second encrypted infrared signal 422, thereby the autonomous moving cleaning apparatus 1 can identify the received infrared signal against other infrared ray sources (such as infrared rays emitted from other machinery, sunlight or other lamp lights).

Figure 4:
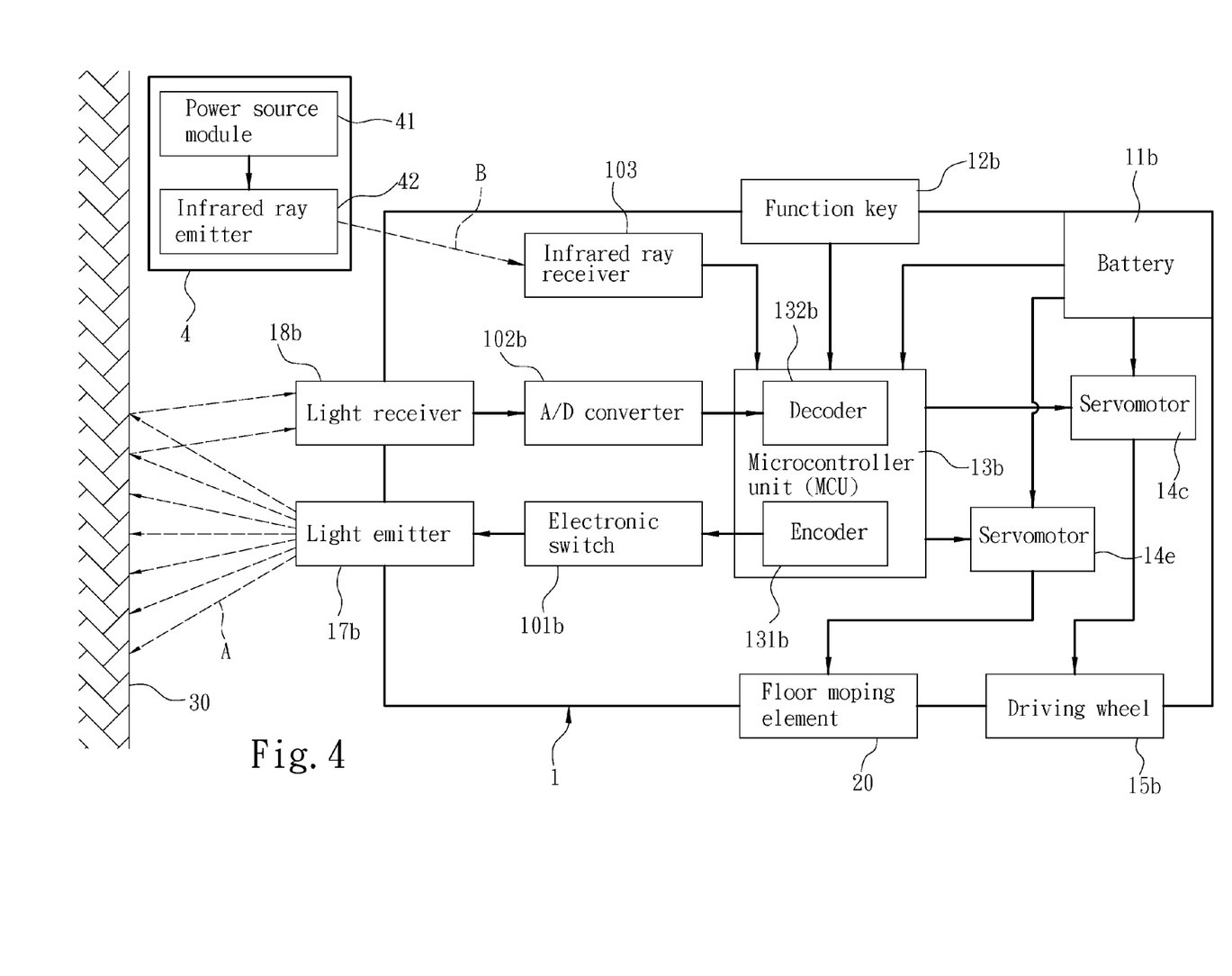
FIG. 4 is a schematic block diagram of a third embodiment of the movement operation system of the invention.

Please refer to FIG. 4 for a third embodiment of the movement operation system for autonomous moving cleaning apparatus according to the invention. It comprises an autonomous moving cleaning apparatus 1 and a charging dock 4. The charging dock 4 includes a charging module 41 to output charge electric power and an infrared ray emitter 42 to emit at least one infrared ray B. The infrared ray B includes at least one encrypted infrared signal. The autonomous moving cleaning apparatus 1 includes at least a battery 11b which has a predetermined charge voltage and provides electric power for the autonomous moving cleaning apparatus 1 to operate, a driving wheel 15b to drive the autonomous moving cleaning apparatus 1 to move, at least one servomotor 14c and 14e to drive the driving wheel 15b, an infrared ray receiver 103 to receive the encrypted infrared signal, and an MCU 13b to control the servomotors 14c and 14e to rotate. The MCU 13b provides a digital signal which is processed through an encoding technique, such as a Manchester encoding technique, to form an encrypted code data set 100 for sending out continuously. The MCU 13b also decodes the encrypted infrared signal and detects the present voltage of the battery 11b. In the event that the present voltage of the battery 11b is higher than the charge voltage, the MCU 13b generates a first control signal to control the servomotor 14c to move the autonomous moving cleaning apparatus 1 away from the charging dock 4. In the event that the present voltage of the battery 11b is lower than the charge voltage, the MCU 13b generates a second control signal to control the servomotor 14c to move the autonomous moving cleaning apparatus 1 to the charging dock 4 and couple therewith to receive the charge electric power to charge the battery 11b.

The autonomous moving cleaning apparatus 1 also includes a light emitter 17b (such as an LED tube) activated by a voltage transmitted and converted by the MCU 13b, a light receiver 18b to receive light A from the light emitter 17b and convert the light and transmit to the MCU 13b, and a function key 12b to select preset functions provided by the MCU 13b to control the servomotors 14c and 14e. The MCU 13b further can include an encoder 131b to form the encrypted code data set 100 (as shown in FIG. 1) and a decoder 132b to compare the digital signal with the encrypted code data set 100 for decoding. The autonomous moving cleaning apparatus 1 also can include an electronic switch 101b (such as a triode or MOS tube) controlled by data values of the encrypted code data set 100 and an A/D converter 102b to convert the low or high voltage formed by the light A received by the light receiver 18b to the corresponding digital signal. Thus, the MCU 13b can continuously send the encrypted code data sets 100 with their data values converted to the low or high voltage through the electronic switch 101b to activate the light emitter 17b to generate dim or bright light A. The light receiver 18b incessantly receives the light reflected by an obstacle 30 from the dim or bright light A to form a corresponding low or high voltage which is then converted by the A/D converter 102b to become a corresponding digital signal for providing to the MCU 13b to compare with the encrypted code data set 100 for decoding so that the MCU 13b can control the servomotor 14c to rotate forward, decelerate, rotate backward or stop rotating according to decoding correctness and strong, weak, present or absent condition of the detected digital signal. The autonomous moving cleaning apparatus 1 is a floor moping machine with a floor moping element 20 attached to a lower side thereof to clean dirt on a floor. The floor moping element 20 can be a flat plate with a moping cloth or paper towel attached thereon.

Please also refer to FIGS. 5 and 6 for the continuous digital signals of the first and second encrypted infrared signals. The encrypted infrared signal further includes a first encrypted infrared signal 421 with a first encrypted code and a first operating frequency and a second encrypted infrared signal 422 with a second encrypted code and a second operating frequency. That means the infrared ray emitter 42 can emit the first encrypted infrared signal 421 and second encrypted infrared signal 422 in different encrypted codes, such as the encrypted code of the first encrypted infrared signal 421 being 110111010001, while the encrypted code of the second encrypted infrared signal 422 being 101100011101; or the infrared ray emitter 42 can emit the first encrypted infrared signal 421 and second encrypted infrared signal 422 in a same encrypted code but different operating frequencies, such as 38 KHZ for the first encrypted infrared signal 421 and 50 KHZ for the second encrypted infrared signal 422, thereby the autonomous moving cleaning apparatus 1 can identify the received infrared signal against other infrared ray sources (such as infrared rays emitted from other machinery, sunlight or other lamp lights).

As a conclusion, the movement operation system for autonomous moving cleaning apparatus of the invention functions mainly by sending an encrypted infrared signal which is decoded by the MCU 13 and detecting the present voltage of the battery 11. When the present voltage of the battery 11 is higher than the charge voltage, the MCU 13 generates a first control signal to control the servomotors 14a, 14b, 14c, 14d and 14e to move the autonomous moving cleaning apparatus 1 away from the charging dock 4. Namely, after the charging dock 4 has emitted the encrypted infrared signal, the autonomous moving cleaning apparatus 1 can dodge the charging dock 4 without hitting thereof during normal operation. When the present voltage of the battery 11 is lower than the charge voltage, the MCU 13 generates a second control signal to control the servomotors 14a, 14b, 14c, 14d and 14e to move the autonomous moving cleaning apparatus 1 to the charging dock 4 and couple therewith to receive the charge electric power to charge the battery 11. That is to say, after the charging dock 4 has emitted the encrypted infrared signal, the autonomous moving cleaning apparatus 1 is moved to the charging dock for charging since the present voltage of the battery 11 is insufficient and requires charging. Moreover, the encrypted infrared signal can be encrypted in different codes or different operating frequencies for the autonomous moving cleaning apparatus 1 to identify whether the infrared ray is valid or belongs to other infrared ray sources so that the autonomous moving cleaning apparatus 1 can steadily and smoothly perform operation without being interfered by the external lights.

What is claimed is:

1. A movement operation system for autonomous moving cleaning apparatus, comprising:
    a charging dock including a charging module for outputting charge electric power and an infrared ray emitter for emitting at least one encrypted infrared signal; and
    an autonomous moving cleaning apparatus including:
        a battery which provides electric power for the autonomous moving cleaning apparatus to operate and includes a predetermined charge voltage;
        a driving wheel for driving the autonomous moving cleaning apparatus to move;
        a floor sweeping roller for cleaning dirt on a floor;
        at least one servomotor for driving the driving wheel and the floor sweeping roller;
        an infrared ray receiver for receiving the encrypted infrared signal;
        a microcontroller unit which controls the servomotor to rotate and provides a digital signal processed via an encoding technique to form an encrypted code data set for sending out continuously and decodes the encrypted infrared signal and detects present voltage of the battery to generate a first control signal for controlling the servomotor to move the autonomous moving cleaning apparatus away from the charging dock in the event that the present voltage of the battery is higher than the charge voltage, or generate a second control signal for controlling the servomotor to move the autonomous moving cleaning apparatus to the charging dock and couple therewith to receive the charge electric power for charging the battery in the event that the present voltage of the battery is lower than the charge voltage;
        a light emitter which is activated by a voltage sent and converted by the microcontroller unit;
        a light receiver for receiving light from the light emitter and converting the light for sending to the microcontroller unit for operation; and
        a function key for selecting preset functions provided by the microcontroller unit to control the servomotor;
    wherein the encrypted code data set includes data values which are converted to a low or a high voltage to activate the light emitter to generate dim or bright light, and wherein the light receiver receives the reflective dim or bright light from the light emitter continuously to form a corresponding low or high voltage which is then converted to a corresponding digital signal for providing to the microcontroller unit to compare with the encrypted code data set for decoding so that the microcontroller unit controls the servomotor to rotate forward, decelerate, rotate backward or stop rotating according to correctness of the decoding and the detected digital signal in a strong, weak, present or absent condition.

2. The movement operation system of claim 1, wherein the encrypted code data set is formed via a Manchester encoding technique.

3. The movement operation system of claim 1, wherein the microcontroller unit further includes an encoder for forming the encrypted code data set and a decoder for comparing the digital signal with the encrypted code data set for decoding.

4. The movement operation system of claim 1, wherein the autonomous moving cleaning apparatus further includes an electronic switch controlled by the data values in the encrypted code data set and an analog/digital converter (A/D converter) for converting the low or high voltage formed by the light received by the light receiver to the corresponding digital signal.

5. The movement operation system of claim 1, wherein the autonomous moving cleaning apparatus is a floor sweeping machine.

6. The movement operation system of claim 1, wherein the encrypted infrared signal includes a first encrypted infrared signal with a first encrypted code and a first operating frequency and a second encrypted infrared signal with a second encrypted code and a second operating frequency.

7. A movement operation system for autonomous moving cleaning apparatus, comprising:
    a charging dock including a charging module for outputting charge electric power and an infrared ray emitter for emitting at least one encrypted infrared signal; and
    an autonomous moving cleaning apparatus including:
        a battery which provides electric power for the autonomous moving cleaning apparatus to operate and includes a predetermined charge voltage;
        a driving wheel for driving the autonomous moving cleaning apparatus to move;
        a dust suction fan motor for cleaning dirt on a floor;
        at least one servomotor for driving the driving wheel;
        an infrared ray receiver for receiving the encrypted infrared signal;
        a microcontroller unit which controls the servomotor to rotate and provides a digital signal processed via an encoding technique to form an encrypted code data set for sending out continuously and decodes the encrypted infrared signal and detects present voltage of the battery to generate a first control signal for controlling the servomotor to move the autonomous moving cleaning apparatus away from the charging dock in the event that the present voltage of the battery is higher than the charge voltage, or generate a second control signal for controlling the servomotor to move the autonomous moving cleaning apparatus to the charging dock and couple therewith to receive the charge electric power for charging the battery in the event that the present voltage of the battery is lower than the charge voltage;

a light emitter which is activated by a voltage sent and converted by the microcontroller unit;

a light receiver for receiving light from the light emitter and converting the light for sending to the microcontroller unit for operation; and a function key for selecting preset functions provided by the microcontroller unit to control the dust suction fan motor and the servomotor;

wherein the encrypted code data set includes data values which are converted to a low or a high voltage to activate the light emitter to generate dim or bright light, and wherein the light receiver receives the reflective dim or bright light from the light emitter continuously to form a corresponding low or high voltage which is then converted to a corresponding digital signal for providing to the microcontroller unit to compare with the encrypted code data set for decoding so that the microcontroller unit controls the servomotor to rotate forward, decelerate, rotate backward or stop rotating according to correctness of the decoding and the detected digital signal in a strong, weak, present or absent condition.

8. The movement operation system of claim 7, wherein the encrypted code data set is formed via a Manchester encoding technique.

9. The movement operation system of claim 7, wherein the microcontroller unit further includes an encoder for forming the encrypted code data set and a decoder for comparing the digital signal with the encrypted code data set for decoding.

10. The movement operation system of claim 7, wherein the autonomous moving cleaning apparatus further includes an electronic switch controlled by the data values in the encrypted code data set and an analog/digital converter (A/D converter) for converting the low or high voltage formed by the light received by the light receiver to the corresponding digital signal.

11. The movement operation system of claim 7, wherein the autonomous moving cleaning apparatus is a vacuum cleaner which includes a dust suction port at a lower side thereof connecting with the dust suction fan motor.

12. The movement operation system of claim 7, wherein the encrypted infrared signal includes a first encrypted infrared signal with a first encrypted code and a first operating frequency and a second encrypted infrared signal with a second encrypted code and a second operating frequency.

13. A movement operation system for autonomous moving cleaning apparatus, comprising:

a charging dock including a charging module for outputting charge electric power and an infrared ray emitter for emitting at least one encrypted infrared signal; and an autonomous moving cleaning apparatus including:

a battery which provides electric power for the autonomous moving cleaning apparatus to operate and includes a predetermined charge voltage;

a driving wheel for driving the autonomous moving cleaning apparatus to move;

at least one servomotor for driving the driving wheel;

an infrared ray receiver for receiving the encrypted infrared signal;

a microcontroller unit which controls the servomotor to rotate and provides a digital signal processed via an encoding technique to form an encrypted code data set for sending out continuously and decodes the encrypted infrared signal and detects present voltage of the battery to generate a first control signal for controlling the servomotor to move the autonomous moving cleaning apparatus away from the charging dock in the event that the present voltage of the battery is higher than the charge voltage, or generate a second control signal for controlling the servomotor to move the autonomous moving cleaning apparatus to the charging dock and couple therewith to receive the charge electric power for charging the battery in the event that the present voltage of the battery is lower than the charge voltage;

a light emitter which is activated by a voltage sent and converted by the microcontroller unit;

a light receiver for receiving light from the light emitter and converting the light for sending to the microcontroller unit for operation; and a function key for selecting preset functions provided by the microcontroller unit to control the servomotor;

wherein the encrypted code data set includes data values which are converted to a low or a high voltage to activate the light emitter to generate dim or bright light, and wherein the light receiver receives the reflective dim or bright light from the light emitter continuously to form a corresponding low or high voltage which is then converted to a corresponding digital signal for providing to the microcontroller unit to compare with the encrypted code data set for decoding so that the microcontroller unit controls the servomotor to rotate forward, decelerate, rotate backward or stop rotating according to correctness of the decoding and the detected digital signal in a strong, weak, present or absent condition.

14. The movement operation system of claim 13, wherein the encrypted code data set is formed via a Manchester encoding technique.

15. The movement operation system of claim 13, wherein the microcontroller unit further includes an encoder for forming the encrypted code data set and a decoder for comparing the digital signal with the encrypted code data set for decoding.

16. The movement operation system of claim 13, wherein the autonomous moving cleaning apparatus further includes an electronic switch controlled by the data values in the encrypted code data set and an analog/digital converter (A/D converter) for converting the low or high voltage formed by the light received by the light receiver to the corresponding digital signal.

17. The movement operation system of claim 13, wherein the autonomous moving cleaning apparatus is a floor moping machine which includes a floor moping element attached to a lower side thereof for cleaning dirt on a floor.

18. The movement operation system of claim 13, wherein the encrypted infrared signal includes a first encrypted infrared signal with a first encrypted code and a first operating frequency and a second encrypted infrared signal with a second encrypted code and a second operating frequency.

* * * * *